UNITED STATES PATENT OFFICE.

ARTHUR H. BOGANI, OF NEW YORK, N. Y., ASSIGNOR TO THE FOOT MANUFACTURING COMPANY, OF SAME PLACE.

COMPOSITION FOR BUFFING-WHEELS.

SPECIFICATION forming part of Letters Patent No. 609,326, dated August 16, 1898.

Application filed April 5, 1898. Serial No. 676,549. (Specimens.)

*To all whom it may concern:*

Be it known that I, ARTHUR H. BOGANI, a citizen of the United States, residing in the city, county, and State of New York, have invented certain new and useful Improvements in Compositions for Buffing-Wheels, of which the following is a specification.

In the polishing of articles consisting of or coated with brass or nickel it has been usual to make use of buffing-wheels and pulverized rottenstone, chalk, &c. Water has frequently been used in connection with the pulverized material. In time the waste material about the buffer is apt to become "sour" and emit offensive odors more or less prejudicial to the health.

I have found that a composition of Vienna lime and camphor can be used for buffing without any disagreeable effects or detrimental results, the camphor, in fact, acting as a disinfectant, and, further, that by its use I am enabled to secure a high and durable polish upon brass and nickel surfaces, and the latter retain their color.

In the preparation of the improved material I add one part, by weight, of gum-camphor to eight parts, by weight, of Vienna lime, grind the articles together, melt, and mold into a block in a mold, or I make a paste of the lime with water, add the camphor, and grind together, and then pour into a mold and heat until the material hardens into a cake or bar, in which shape it is sold and used for buffing.

While I prefer Vienna lime, I may use instead thereof ordinary lime, rottenstone, or other earthy matter. In some cases advantageous results are obtained from the addition to the composition of the stearic acid or its equivalent, as lattar, paraffin, or other greasy or waxy matters.

Without limiting myself to the proportions specified, I claim—

1. A buffing composition consisting of earthy matter and camphor, substantially as set forth.

2. A buffing composition of Vienna lime and camphor, substantially as set forth.

In testimony whereof I have signed my name to this specification in the presence of two subscribing witnesses.

ARTHUR H. BOGANI.

Witnesses:
NEWTON CLARK,
JOHN RILEY.